May 28, 1968 E. A. LLOYD 3,385,282
UNITARY GRILL PACKAGE
Filed May 3, 1967
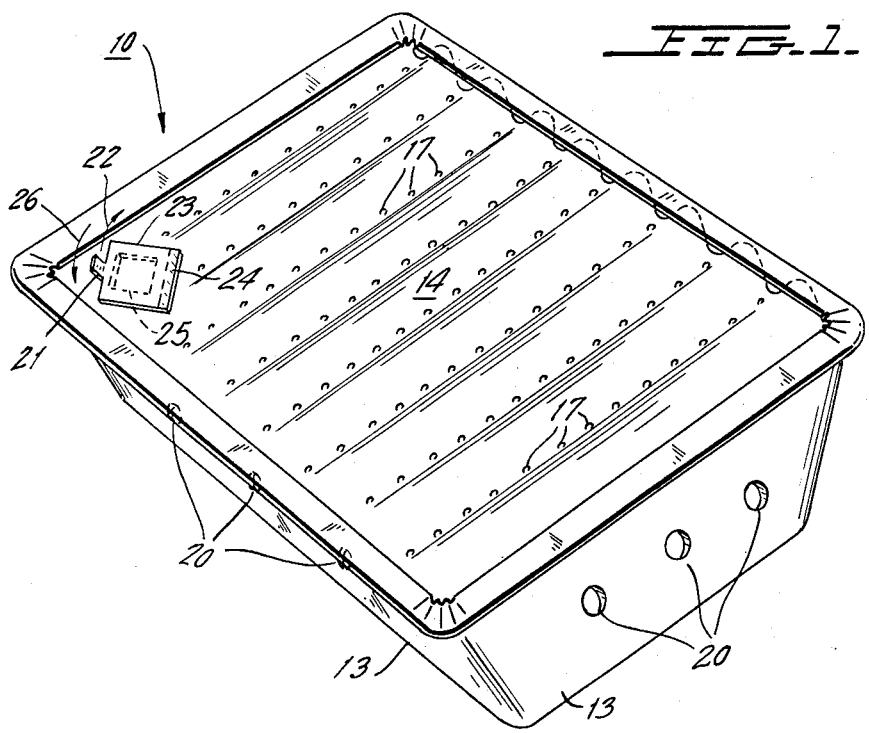
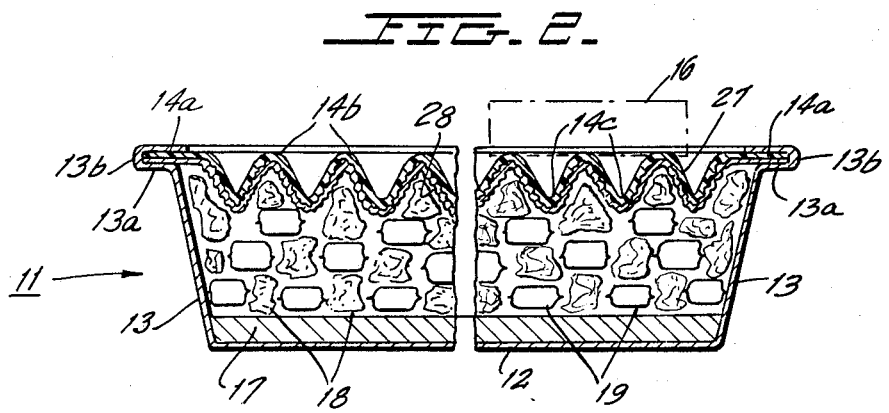
INVENTOR.
EUGENE A. LLOYD
BY
OSTROLENK, FABER, GERB & SOFFEN
ATTORNEYS

United States Patent Office 3,385,282
Patented May 28, 1968

3,385,282
UNITARY GRILL PACKAGE
Eugene A. Lloyd, Amityville, N.Y., assignor to Niphos Corporation, Westbury, N.Y.
Filed May 3, 1967, Ser. No. 635,784
9 Claims. (Cl. 126—25)

ABSTRACT OF THE DISCLOSURE

This invention teaches a unitary package for cooking or heating foodstuffs which is comprised of a pan preferably formed of aluminum having integrally formed side walls each provided with openings at spaced intervals to provide a draft for the fire contained within the package.

---

The fuel constituents are crumpled paper and charcoal briquettes impregnated with a suitable solution to facilitate fast starting of the fire. Optionally the base of the pan may be provided with a sheet of fire retardant material to permit the grill package to be supported upon a surface without scorching the surface.

The pan is provided with flanges bent down to receive and firmly grip the marginal edges of a cover grill preferably formed of aluminum and having a corrugated or serpentine configuration to provide minimum surface contact between the grill cover and the foodstuffs being cooked, as well as providing a plurality of troughs for receiving or collecting drippings from the foodstuffs being heated.

Each trough is provided with a plurality of openings arranged in spaced intervals along the base of each trough to permit the drippings to pass therethrough and be consumed by the fire so as to further intensify the heat of the fire.

The aluminum sheets are highly reflective causing heat rays contained within the package to be reflected toward the center of the package interior and thereby further intensify the heat of the fire.

The corner of the grill cover is provided with a liftable tab in order to gain access to the fuel constituents, which tab may then be bent down after the fire is suitably ignited to prevent any flames from being emitted upwardly through the grill cover and thereby substantially containing all flame and heat within the package interior.

The instant invention relates to cooking means and more particularly to a novel disposable charcoal grill provided in a complete self-contained unit capable of being used in any imaginable location and which is easy to ignite, which quickly cooks the food product desired to be heated and which is capable of preventing scorching of any surface upon which it may be set.

There are many instances in which it is desirable and often necessary to prepare food out of doors. For example, during vacation trips, camping trips or other similar outings, it is necessary, in order to prepare food which requires cooking or heating, to provide some means for suitably heating the food in a simplified, neat and clean manner.

One typical way of preparing such foodstuffs is to prepare a wood or charcoal fire. Charcoal fires are preferred due to the flavoring which they impart to the cooked foodstuffs. Such charcoal fires are normally comprised of providing charcoal, typically in the form of briquettes, upon a suitable surface and providing means for starting the fire in order to prepare the food. The disadvantages of this type of a fire are that of requiring handling of the briquettes which is a distasteful and dirty job, providing a suitable surface upon which the briquettes may be placed and providing a grill above the charcoal fire upon which the foodstuff may be placed for being suitably heated.

After the foodstuffs are cooked the fire must be put out and the remnants of the fire must be discarded. The above arrangement normally requires the provision of a charcoal grill which must be carried both to the camp site (or other site) and which must be carried back from the camp site and cleaned and made in readiness for future use requiring the performance of another distateful duty.

The instant invention overcomes all of the above mentioned disadvantages through the provision of a fully assembled, easy to handle, disposable charcoal grill package which is simple and easy to ignite, is much safer than present day charcoal grill assemblies, which cooks the food at a much more rapid rate and which is very easily disposed of in one complete package.

The charcoal grill package of the instant invention is comprised of an aluminum pan which may be of any suitable shape such as circular, square, rectangular, hexagonal, or any other desired configuration. Extending upwardly from the base of the pan are sides which vary in number, depending upon the configuration of the pan as mentioned hereinabove, so as to form a continuous wall around the base of the pan. The sides are formed integral with the base of the pan and preferably the pan base and side walls may be stamped or otherwise formed from a single sheet of aluminum, for example, of a suitable gauge.

The pan side walls are provided with flanges which fold over toward the center of the pan in order to firmly receive and hold down the marginal edges of the pan cover.

The pan cover has a configuration substantially identical and preferably slightly larger in surface area relative to the base of the pan so that its marginal edges may rest upon the top surface of the pan side walls with the flanges being folded down upon the marginal edges to firmly grip the marginal edges of the pan cover.

The pan cover has a corrugated or a serpentine configuration so as to form a plurality of grooves or troughs with the top portions of the pan cover being capable of supporting the food to be cooked and with the bases of the troughs being provided to receive and collect any drippings produced as a result of the cooking or heating of the foodstuffs. The base of each trough is provided with a plurality of openings of any suitable configuration arranged at spaced intervals along each trough to enable any drippings to drip into the interior of the disposable charcoal package in order to be burned therein, thereby intensifying the flames produced by the grill.

The charcoal grill cover is preferably formed of aluminum of a suitable gauge which is further ribbed or pleated to provide supporting strength supplementary to the corrugations mentioned hereinabove.

The base of the pan supports a sheet of asbestos or other suitable fire retardant material enabling the charcoal grill package to be placed upon a surface such as a wood surface without scorching same.

Pieces of crumpled paper and self-lighting impregnated charcoal briquettes are placed within the charcoal grill package to provide the fuel for the grill. The briquettes are impregnated with a liquid or other suitable waxy self-lighting composition to facilitate ignition of the fire.

Each side wall of the charcoal grill package is provided with a plurality of openings of any suitable configuration to provide a draft for the fire.

One corner of the charcoal grill pan cover is provided with a tab which may be lifted upwardly by an amount sufficient to insert a match or other suitable source of flame in order to ignite the fuel contained within the package. Once the fuel is satisfactorily ignited the lift up tab may then be pressed downwardly so as to substantially seal the top surface in order to prevent any flames from being emitted upwardly through the cover grill.

The cover, the base of the pan and the side walls being formed of aluminum all reflect heat inwardly to intensify the heat of the charcoal grill package and thereby cook the foodstuffs at a much faster rate than conventional devices. In the case where foodstuffs such as meat or other similar foodstuffs which generate drippings are being cooked upon the grill, the drippings are collected and passed through the openings provided in the grill cover so as to be consumed by the flames of the fire and thereby intensify the heat generated by the grill package.

The exposed surface of the cover grill may optionally be provided with a suitable non-stick coating such as, for example, Teflon, to provide a non-stick surface. Exhaustive tests performed with the grill package have shown that, even in the absence of the non-stick surface, foodstuffs cooked upon the grill will not stick to the cover grill surface.

After all of the foodstuffs have been cooked, the charcoal grill package may be easily disposed of in one unit without any necessity for touching any of the fuel constituents so that the disposable function may be carried out in a neat and clean fashion.

It is therefore one subject of the instant invention to provide a novel unitary charcoal grill package for cooking foodstuffs and the like.

Another object of the instant invention is to provide a novel unitary charcoal grill package in which all of the constituents for a charcoal fire are preassembled with the package requiring only ignition of the fuel by a flame from some external source.

Still another object of the instant invention is to provide a novel unitary charcoal grill package formed of a relatively shallow pan preferably comprised of aluminum of a suitable gauge and having a cover firmly held down by flanges provided on the pan side wall, the grill cover having a substantially corrugated configuration to provide a grill surface for cooking foodstuffs and having a plurality of troughs with openings at spaced intervals along each trough to permit drippings received and collected in each trough to pass through the grill cover to the interior thereof to be consumed by the flames and intensify the heat of the unit to facilitate quicker cooking or heating of the foodstuffs.

Still another object of the instant invention is to provide a novel unitary charcoal grill package formed of a relatively shallow pan preferably comprised of aluminum of a suitable gauge and having a cover firmly held down by flanges provided on the pan side wall, the grill cover having a substantially corrugated configuration to provide a grill surface for cooking foodstuffs and having a plurality of troughs with openings at spaced intervals along each trough to permit drippings received and collected in each trough to pass through the grill cover to the interior thereof to be consumed by the flames and intensify the heat of the unit to facilitate quicker cooking or heating of the foodstuffs and further comprising a liftable tab at one corner of the grill cover which may be lifted to insert a flame into the package interior to ignite the fuel contained therein and which may be subsequently folded down to prevent any flames from being emitted upwardly through the grill cover.

Still another object of the instant invention is to provide a novel unitary charcoal grill package formed of a relatively shallow pan preferably comprised of aluminum of a suitable gauge and having a cover firmly held down by flanges provided on the pan side wall, the grill cover having a substantially corrugated configuration to provide a grill surface for cooking foodstuffs and having a plurality of troughs with openings at spaced intervals along each trough to permit drippings received and collected in each trough to pass through the grill cover to the interior thereof to be consumed by the flames and intensify the heat of the unit to facilitate quicker cooking or heating of the foodstuffs and further comprising a liftable tab at one corner of the grill cover which may be lifted to insert a flame into the package interior to ignite the fuel contained therein and which may be subsequently folded down to prevent any flames from being emitted upwardly through the grill cover and wherein the reflective properties of the interior surfaces of the package still further intensify the flames.

Still another object of the instant invention is to provide a novel unitary charcoal grill package formed of a relatively shallow pan preferably comprised of aluminum of a suitable gauge and having a cover firmly held down by flanges provided on the pan side wall, the grill cover having a substantially corrugated configuration to provide a grill surface for cooking foodstuffs and having a plurality of troughs with openings at spaced intervals along each trough to permit drippings received and collected in each trough to pass through the grill cover to the interior thereof to be consumed by the flames and intensify the heat of the unit to facilitate quicker cooking or heating of the foodstuffs and further comprising a liftable tab at one corner of the grill cover which may be lifted to insert a flame into the package interior to ignite the fuel contained therein and which may be subsequently folded down to prevent any flames from being emitted upwardly through the grill cover and wherein the reflective properties of the interior surfaces of the package still further intensify the flames, the side walls of the charcoal grill pan being provided with openings arranged in spaced intervals to provide a suitable draft to sustain the fire of the charcoal grill.

These and other objects of the instant invention will become apparent upon a consideration of the accompanying description and drawings in which:

FIGURE 1 is a perspective view showing a charcoal grill package designed in accordance with the principles of the instant invention.

FIGURE 2 shows a sectional view of the charcoal grill package of FIGURE 1 exposing the interior contents thereof.

Referring now to the drawings there is shown therein in FIGURES 1 and 2 a disposable charcoal grill package 10 comprised of a pan 11 having a base 12 and a plurality of side walls 13 (two adjacent side walls being shown in FIGURE 1 and two opposite side walls being shown in FIGURE 2).

The base 12 of the pan 11, in the preferred embodiment, has a substantially rectangular configuration but any other configuration may be employed such as a square, circular or polygonal configuration. The pan is preferably formed of a single sheet of aluminum of a suitable gauge so as to withstand deformation as a result of normal handling. The pan is preferably stamped or otherwise formed of a single sheet of aluminum so that the side walls 13 extend from and are integral with the pan base 12.

Each of the side walls 13 are bent outwardly at 13a and bent inwardly at 13b so as to form a flange for receiving the adjoining marginal edges 14a of the grill cover 14.

Cover 14 is preferably stamped or otherwise formed from a single sheet of aluminum of a suitable gauge and has a serpentine or corrugated configuration when viewed from a sidewise position as is shown best in FIGURE 2 so as to form a plurality of upward portions 14b interspersed between a plurality of troughs 14c. The top portions 14b of the serpentine configuration act to support the foodstuffs being cooked in the manner shown by the foodstuff 16 portrayed in dotted line fashion in FIGURE 2 so as to provide minimum surface contact between grill cover 14 and the under-surface of the foodstuff 16. In the case where meat or other similar foodstuffs which emit drippings are being cooked, the troughs 14c receive and collect such drippings. Each of the troughs are provided with a plurality of openings 17 arranged at spaced intervals along the base of each trough to enable the collected drippings to pass through the troughs into the interior of the charcoal grill package 10.

A sheet 17 of fire retardant material is preferably provided in the interior of the package so as to be positioned upon the base 12 of the pan 11. The fire retardant material may, for example, be a sheet of asbestos having a configuration substantially identical to the configuration of the pan base 12.

The fuel constituents of the charcoal grill package are comprised of crumpled pieces of paper 18 positioned upon the fire retardant sheet 17 (when a fire retardant sheet is employed) and interspersed with a plurality of charcoal pieces 19 which preferably are charcoal briquettes which have been impregnated with a suitable liquid or coated with a suitable waxy mixture to facilitate ignition of the fuel and make the fuel constituents self-lighting.

Each of the side walls 13 is provided with a plurality of openings 20 arranged at spaced intervals along the side walls for the purpose of providing a suitable draft for the fire contained within the charcoal grill package 10.

One corner of the cover grill 14 is provided with a tab 21 which may be lifted in a direction shown by arrow 22 to provide access to the interior of the charcoal grill package. The tab 21 constitutes a projection formed integrally with a sheet 23 of aluminum which is either heat-sealed or otherwise suitably attached to the grill cover in the region or area designated by the numeral 24. The sheet 23 normally covers and conceals an opening 25 shown in dotted fashion provided in the grill cover 14. The tab 21 is lifted upwardly in the direction shown by arrow 22 so as to expose the opening 25 provided in grill cover 14 to permit the insertion of a lit match or other suitable source of flame into the interior of the charcoal grill package in order to ignite the fuel provided within the package interior. Once the fuel has been ignited the sheet 23 of aluminum may be depressed downwardly substantially in the direction shown by arrow 26 so as to again conceal and suitably cover the opening 25 provided in the cover grill 14. This acts to prevent any flames from being emitted upwardly through the cover grill 14. The openings 17 provided at spaced intervals along the base of each trough 14c, while sufficient to permit drippings collected in each trough to pass into the package interior are small enough so as to prevent flames from being emitted or from passing therethrough.

The minimal surface contact between the top portions 14b of the corrugations provided in the grill cover and the undersurface of the foodstuffs substantially prevent any of the foodstuffs from becoming stuck to the grill cover as a result of the heating or cooking operation. Optionally the top surface of the cover grill may be provided with a non-stick coating 27 of any suitable material such as, for example, Teflon, to facilitate the non-stick characteristics of the charcoal grill package. The exhaustive experimentation with the charcoal grill package has shown the non-stick characteristics to be excellent even in the absence of a non-stick coating.

The fire retardant sheet 17 permits the charcoal grill package to be placed upon a surface such as, for example, a wood surface without danger of scorching the surface in the case where the cooking or heating is performed by placing the charcoal grill package upon such a surface.

The pan 11 and grill cover 14, being formed of highly reflective aluminum, cause the heat rays emitted by the fire to be reflected toward the center of the package interior thereby concentrating and intensifying the heat to cause rapid cooking of the foodstuffs. The drippings which are collected in the troughs 14c and passed through the openings 17 provided in each trough are consumed by the flames of the fire and also serve to intensify the heat to further shorten required cooking time.

The pan 11 and corrugated cover grill 14 are formed of aluminum of a suitable gauge so as to prevent deformation of the package as a result of normal transportation and handling thereof. To further increase the supporting strength and the ability to withstand deformation, the cover grill 14 is preferably formed of a ribbed or pleated aluminum sheet which still further enhances the supporting strength of the grill cover. One suitable form of pleating or ribbing is shown by the undulations provided in the cover member 14 as shown best in FIGURE 2. The undulations 28 may be substantially similar in nature to the corrugations provided in the grill cover but are much smaller or greatly scaled down in configuration. As shown in FIGURE 2 the undulations 28 run substantially parallel to the serpentine configuration. However, it should be understood that the small undulations 28 may run perpendicular to the corrugated configuration or may be replaced by a pleated stamping provided in the grill cover. Such pleated aluminum being presently used in aluminum wrap and generally available in supermarkets and food stores throughout the country.

Once the foodstuffs have been cooked, the charcoal grill package may be easily disposed of simply by immersing the package in water, dousing the package with water, or burying the package in dirt, sand, or any other suitable substance. Obviously, in order to facilitate the putting out of the fire the cover grill and/or the side walls and base may be pierced with a sharp stick, eating utensil, knife or any other suitable means, to provide additional access to the package interior for the purpose of dousing the fire.

Whereas the tab 21 and liftable sheet 23 are shown as being a separate sheet of aluminum secured to the grill cover 14, it should be understood that the tab 21 may alternatively be secured directly to the cover grill sheet which may be prescoured or otherwise stamped to facilitate the tearing up of the grill cover sheet in one corner thereof in order to gain access to fuel constituents provided in the interior of the charcoal grill package.

Whereas the fuel constituents are described as being a mixture of crumpled paper and impregnated self-starting charcoal briquettes, any other suitable fuel material may be provided if desired.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A unitary preassembled package for cooking food products comprising
  a bottom shell portion having an open top;
  a cover-grill portion sealing said open ended top;
  and a suitable fuel contained within the interior area defined by said pan and cover portions;
  said bottom shell portion being comprised of a thin flat sheet of metallic material having good reflective properties;
  said sheet being formed to define a substantially flat base portion having upwardly extending sidewalls formed integrally with said base portion; said sidewalls completely surrounding the perimeter of said base portion;
  said cover grill portion being formed of a thin flat sheet of a metallic material having good heat reflective properties;
  said sheet being formed so that its central area defines a corrugated configuration having a plurality of spaced substantially parallel troughs;
  the base of each trough being provided with a plurality of spaced parallel openings to permit food drippings received and collected in said troughs to pass into the interior of said package;
  at least one portion of the exposed metallic surface of said package portion having an opening to receive an igniting source;

a liftable tab means normally sealing said opening and being capable of being lifted upwardly to provide access to said opening;

selected ones of said sidewalls each having at least one opening to serve as a draft for sustaining a fire within the interior of said package;

said fuel being comprised of a plurality of briquettes.

2. The package of claim 1 wherein the sheets forming said cover grill and said shell are aluminum foil sheets of a thickness suitable to prevent deformation of said package as a result of normal handling.

3. The package of claim 1 wherein said briquettes are impregnated with a mixture to facilitate ignition of the fuel.

4. The package of claim 1 wherein said fuel is further comprised of crumpled pieces of paper interspersed with said briquettes within the package interior.

5. The package of claim 1 further comprising a substantially flat sheet of flame retardant material positioned upon the interior surface of the package base to prevent scorching of a surface upon which the package may be supported.

6. The package of claim 5 wherein said flame retardant sheet is formed of asbestos.

7. The package of claim 1 wherein said grill cover metallic sheet has a substantially flat marginal portion completely surrounding the periphery of said sheet;

the sidewalls of said shell being bent outwardly along a first line spaced inwardly from the marginal edges to receive and support the marginal edges of said cover grill sheet, and being bent inwardly along a second line spaced between said first line and said sidewall marginal edges to form a flange overlying the marginal edges of said cover grill sheet and secure said cover grill sheet to said shell.

8. The package of claim 1 wherein said liftable tab means is positioned upon said cover grill near one marginal edge thereof;

said opening for receiving an igniting source being positioned upon said cover grill and beneath said liftable tab means.

9. The package of claim 8 wherein said liftable tab means is formed of an aluminum sheet of dimensions sufficient to cover its associated opening and having a projecting tab along one edge thereof to facilitate lifting of said sheet secured to the tab;

said sheet being more firmly secured to said cover grill along the marginal portion thereof most remote from said tab to operate as a hinge and being less firmly secured to said cover grill along the remainder of its periphery to facilitate lifting of the sheet secured to the tab.

References Cited

UNITED STATES PATENTS

| | | | |
|---|---|---|---|
| 2,940,381 | 6/1960 | Cottongim et al. | 99—445 |
| 2,965,096 | 12/1960 | Barton. | |
| 3,269,807 | 8/1966 | Key | 44—40 |
| 3,279,900 | 10/1966 | Naples | 44—40 |

FREDERICK L. MATTESON, Jr., *Primary Examiner.*

E. G. FAVORS, *Assistant Examiner.*